(No Model.)
G. W. LEUTY.
FENCE POST.
No. 533,906. Patented Feb. 12, 1895.
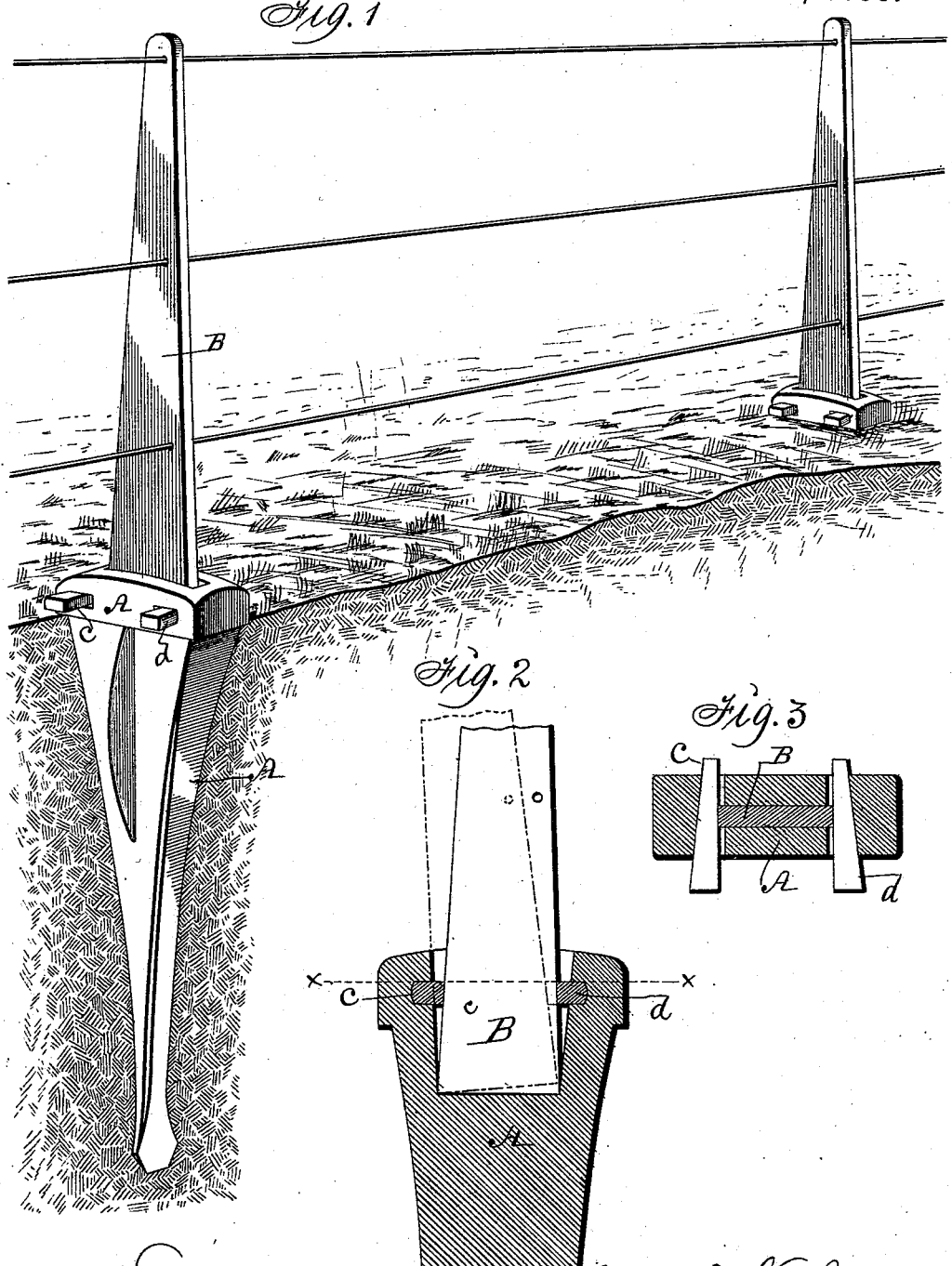

UNITED STATES PATENT OFFICE.

GEORGE W. LEUTY, OF PERCY, IOWA.

FENCE-POST.

SPECIFICATION forming part of Letters Patent No. 533,906, dated February 12, 1895.

Application filed August 15, 1894. Serial No. 520,368. (No model.)

*To all whom it may concern:*

Be it known that I, GEORGE W. LEUTY, a citizen of the United States of America, residing at Percy, in the county of Marion and State of Iowa, have invented a new and useful Fence-Post, of which the following is a specification.

My object is to provide a post that can be fixed in the ground in such a manner that the top portion thereof can be adjusted relatively to the butt or fixed part without loosening or adjusting the same in the ground so that a post can be readily straightened or set perpendicularly when the part fixed in the ground is not perpendicular and the post adjustably and securely fastened to the butt by means of keys.

My invention consists in a strong, durable post composed of two detachably and adjustably connected parts as hereinafter set forth, pointed out in my claim and illustrated in the accompanying drawings, in which—

Figure 1 is a perspective view of a wire fence showing my invention in practical use. Fig. 2 is an enlarged sectional view showing how the two parts are detachably and adjustably combined to produce a rigid post. Fig. 3 is a transverse sectional view through the line *x x* in Fig. 2 showing the two parts keyed together.

The letter A designates the butt or base adapted to be fixed in the ground. It is preferably made of cast iron in a mold and may vary in configuration, size and weight. It has an angular cavity, extending downward from its top, and wider at its top than at its bottom that is adapted to admit the bottom end of the adjustable and detachable top part of the post. It also has angular transverse holes that intersect the cavity that extends vertically and are adapted to admit wedges.

B represents the top part of my complete post. It is preferably made of steel, flat-sided and tapering, the bottom end being the largest in width and adapted to enter the socket or cavity in the part A to be fastened therein, by means of one or two keys, in such a manner that the two parts will be rigidly combined as required to support fence wires or rails, and also in such a manner that the top can be adjusted as indicated by dotted lines in Fig. 2.

*c* and *d* are keys fitted in the transverse holes of the butt A as required to engage the tapering and inclined edges of the bottom portion of the part B, as clearly shown in Fig. 3.

I claim as my invention—

An improved separable and adjustable fence post comprising a butt A having a cavity in its top that narrows in width from the top surface downward and one or two transverse holes intersecting the cavity, and a part B having its lower end tapering upward and adapted to enter said cavity to be adjusted and keyed fast therein substantially as and for the purposes stated.

GEORGE W. LEUTY.

Witnesses:
AMOS LEUTY,
J. L. CARTER.